(12) United States Patent
Noel, II

(10) Patent No.: US 8,577,556 B1
(45) Date of Patent: Nov. 5, 2013

(54) ELECTRONICALLY CONTROLLED GIMBALED PLATFORM FOR STEADYING ILLUMINATION SOURCES ON VEHICLES

(76) Inventor: Phares Azarael Noel, II, Detroit, MI (US)

( * ) Notice: Subject to any disclaimer, the term of this patent is extended or adjusted under 35 U.S.C. 154(b) by 359 days.

(21) Appl. No.: 12/959,353

(22) Filed: Dec. 2, 2010

(51) Int. Cl.
*B60Q 1/00* (2006.01)

(52) U.S. Cl.
USPC .............................................. 701/49; 211/78

(58) Field of Classification Search
USPC ............ 701/49; 362/473–476, 506, 507, 540; 248/200, 300, 205.2, 206.1, 207, 248/216.4, 222.52; 296/78.1, 96, 96.2, 296/96.21, 97.4; 211/78, 71.01, 1.53, 5, 70, 211/17, 69.5; 340/427, 429, 458, 468, 480
See application file for complete search history.

(56) References Cited

U.S. PATENT DOCUMENTS

| | | | |
|---|---|---|---|
| 3,509,765 A * | 5/1970 | Berg et al. | 73/178 R |
| 4,482,939 A | 11/1984 | Tishman | |
| 5,195,816 A | 3/1993 | Moss, Jr. et al. | |
| 5,426,571 A * | 6/1995 | Jones | 362/466 |
| 5,580,148 A | 12/1996 | Liao | |
| 5,806,956 A | 9/1998 | Hyun-Jo | |
| 5,868,488 A | 2/1999 | Speak et al. | |
| 6,010,237 A | 1/2000 | Gotou | |
| 6,478,457 B1 | 11/2002 | Manley | |
| 6,761,476 B2 | 7/2004 | Pascutiu | |
| 6,874,918 B2 | 4/2005 | Tawa et al. | |
| 6,886,957 B2 | 5/2005 | Uchida | |
| 7,140,758 B2 * | 11/2006 | Suzuki et al. | 362/523 |
| 7,234,849 B2 | 6/2007 | Hori et al. | |
| 7,241,034 B2 | 7/2007 | Smith et al. | |
| 7,672,760 B2 | 3/2010 | Solberg et al. | |
| 7,674,022 B2 | 3/2010 | Nakano et al. | |
| 2006/0023461 A1 | 2/2006 | Knight | |

* cited by examiner

*Primary Examiner* — Dalena Tran
(74) *Attorney, Agent, or Firm* — Singh Law Firm, PLLC; Gautam B. Singh

(57) ABSTRACT

The invention is an electronically controlled gimbaled platform that is installed on a vehicle. An illumination source mounted on the gimbaled platform provides a steady source of illumination in a desired direction. The desired direction of illumination is initially set and stored in a digital control unit. Subsequently, the digital control unit receives real-time measurements of instantaneous rotations experienced by the vehicle. The digital control unit uses the instantaneous vehicle rotation measurements to compute control signals that compensate for vehicle's movements. The compensatory control signals are communicated to actuators that control the orientation of the gimbaled platform in real-time. The effect of the compensatory control signals is to correct for the dynamic disturbances experienced by the vehicle and thereby provide a steady source of illumination unaffected by changes in the vehicle dynamics. Therefore, the invention facilitates in safer operation of vehicles.

19 Claims, 11 Drawing Sheets

ELECTRONICALLY CONTROLLED GIMBALED PLATFORM FOR STEADYING ILLUMINATION SOURCES ON VEHICLES

FIELD OF INVENTION

The disclosed invention is an electronically controlled gimbaled platform assembly capable of rotational movements about three independent axes so that an illumination source mounted on the gimbaled platform remains oriented in a specified direction irrespective of dynamic changes experienced by the vehicle.

BACKGROUND

Vehicle illumination systems are broadly categorized into primary and auxiliary illumination systems. Whereas primary illumination systems, such as headlights on an automobile, are used for pathway illumination and generally required, auxiliary illumination systems are used for added illumination during abnormal driving conditions, in emergency, or in special situations as when a vehicle resorts to extra-ordinary maneuvers. In either case, illumination systems are generally mounted and attached rigidly to the vehicle body frame or, as is the case with primary illumination systems, integrated into the body design.

When an illumination source is rigidly mounted on a vehicle, the area towards which the source points ceases to be steadily illuminated if the vehicle rocks and the illumination source cannot steadily maintain its intended direction. For example, the lights mounted on a boat will periodically point upwards towards the sky as it rocks over the crests and troughs of waves in a waterway. Similarly, the lights on an all-terrain land vehicle point skywards rather than illuminate the land passageway the vehicle intends to travels upon when the vehicle climbs over undulations or obstructions in its path that change its aspect with respect to the horizon.

Vehicle illumination apparatus has generally been developed for primary illumination systems in automobiles, and has typically aimed to compensate for vehicle's turning and similar specifically detectable movements. These illumination control system utilize vehicle speed, steering angle, pitch, and the suspension height as a basis for adjusting illumination. Swiveling headlamp assembles have been designed to enable a driver to better negotiate turns. And, apparatus for adjusting headlights using vehicle's turning angle and hood orientation has been developed.

What is needed is a general purpose illumination system that monitors instantaneous dynamic movements of a vehicle and provides a steady illumination source regardless of the nature and type of disturbances experienced by the vehicle—whether or not these changes were brought about by the intentional actions of the driver, or effectuated by external factors. A source of steady illumination, particularly in unforeseen situations, is needed to prevent the vehicle from being put in compromising illumination conditions that jeopardize the vehicle and its occupants.

SUMMARY OF INVENTION

This application discloses a gimbaled platform assembly which is installed on a vehicle. The gimbaled platform assembly has a gimbaled platform upon which the illumination source is mounted. The gimbaled platform is equipped with actuators that control the orientation of the gimbaled platform and thereby the direction of illumination provided by the illumination source mounted on the gimbaled platform. The illumination source maintains a steady orientation even when the vehicle rolls, pitches or yaws, as for example when a land vehicle travels over undulating terrain, a water vehicle experiences changing navigational conditions, or when an air borne vehicle is subjected to elements causing it to bounce about erratically.

An Inertial Measurement Unit, or an IMU, is attached to the vehicle body and senses the vehicle's rotational acceleration about three independent axes. A digital control unit continuously monitors the transient vehicle rotations sensed by the IMU and responds by sending compensatory signals to the actuators that alter the orientation of the gimbaled platform and thereby maintain the illumination source in a steady configuration and direction regardless of the rotational disturbances experienced by the vehicle. The digital control unit uses a feedback control system based on a Proportional Integral Differential (PID) or other methods, for controlling the orientation of the gimbaled platform in real time.

DRAWINGS

Figures

FIG. 1 illustrates a high level architecture of the electronically controlled gimbaled platform in accordance with an embodiment of the invention.

FIG. 2 provides an isometric view of the electronically controlled gimbaled platform assembly with a mounted illumination source in accordance with an embodiment of the invention.

Figure 5A:
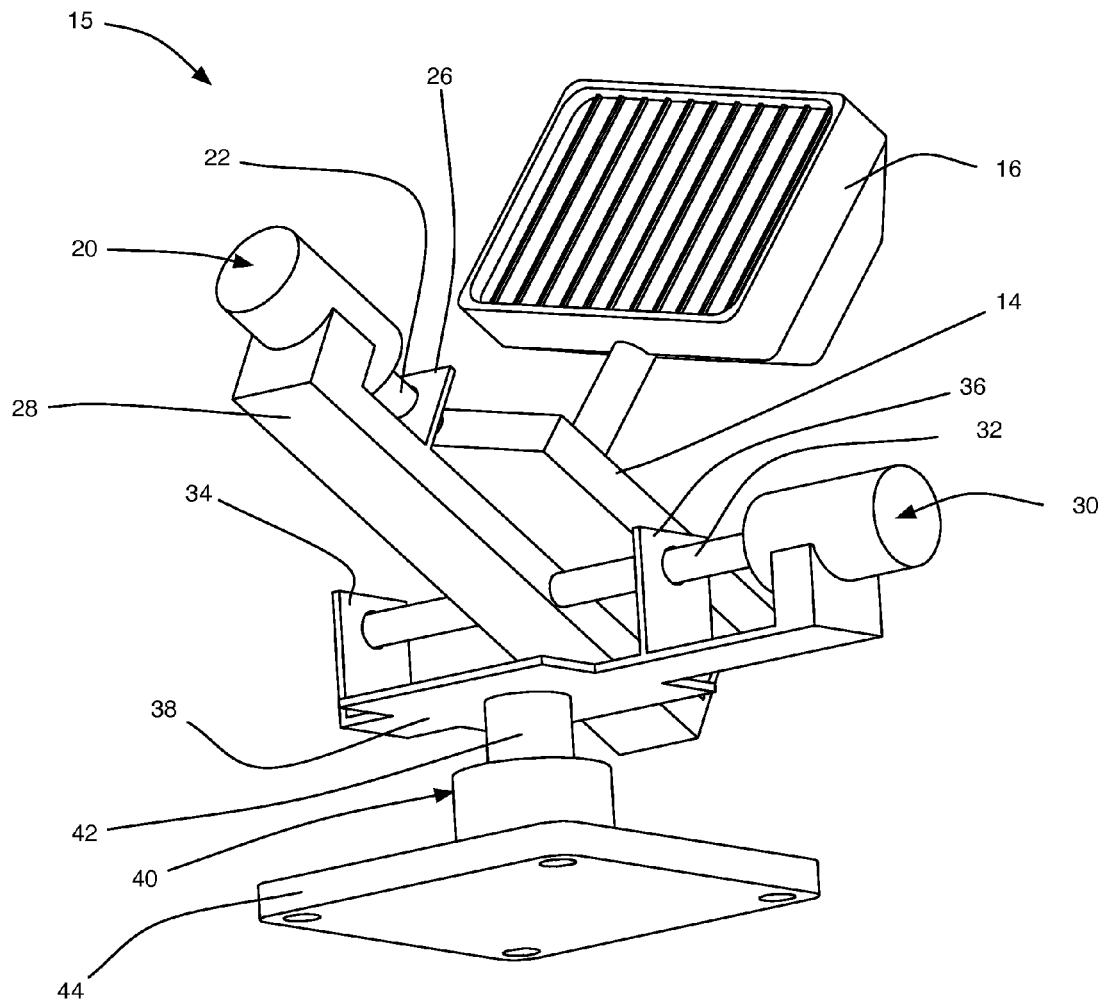
Figure 5B:
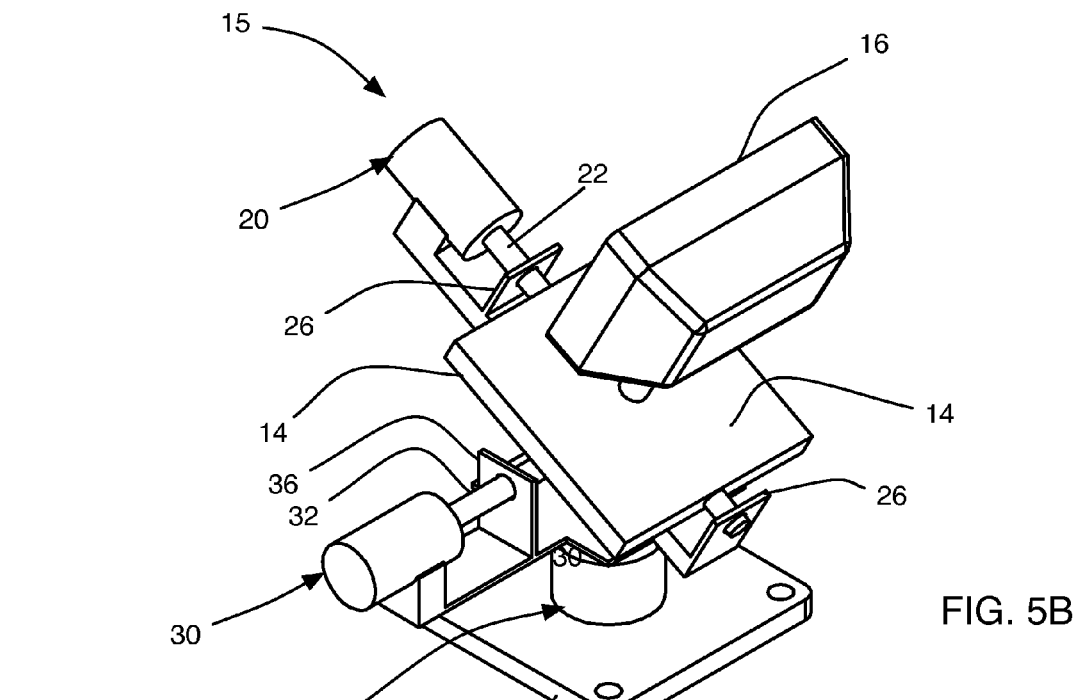
Figure 5C:
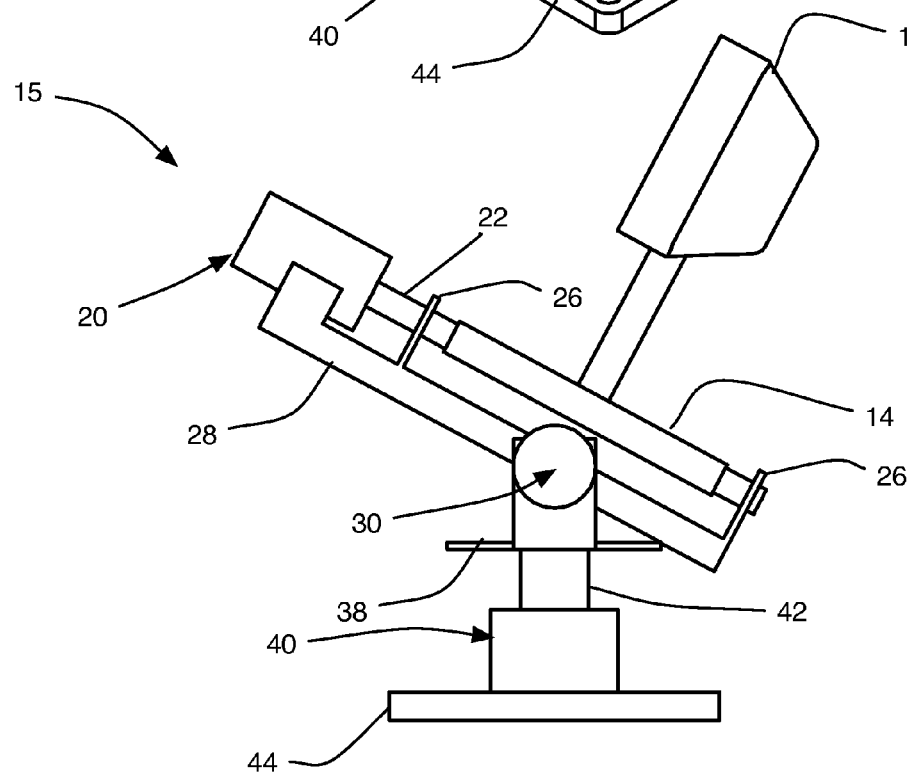

FIGS. 5A, 5B, and 5C respectively illustrate the front, rear, and side views of electronically controlled gimbaled platform assembly with a mounted illumination source in accordance with an embodiment of the invention. The platform as shown is rotated about the roll-axis in this illustration.

Figure 6:
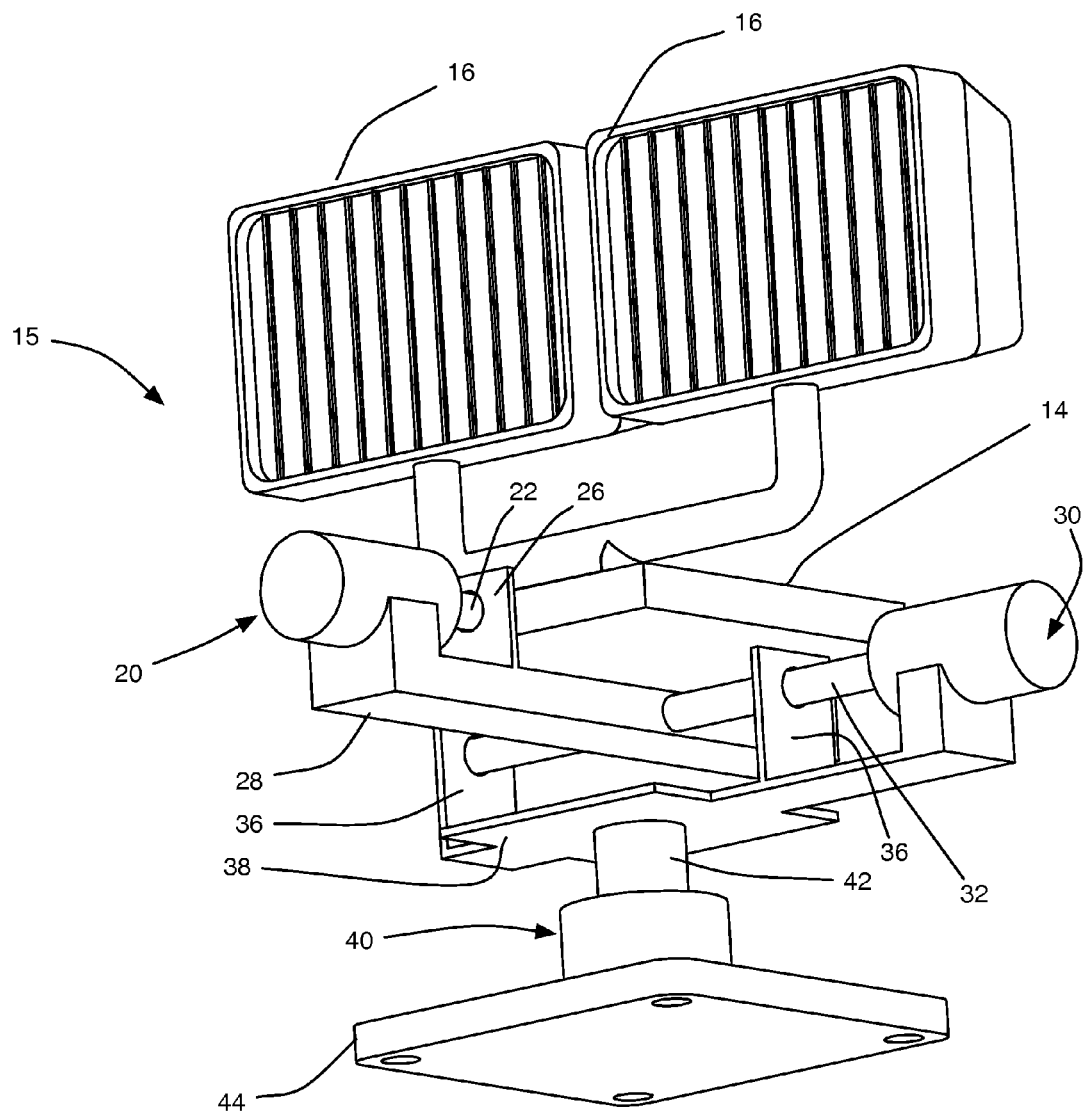

FIG. 6 illustrates a single electronically controlled gimbaled platform upon which a pair of illumination sources are mounted in accordance with an embodiment of the invention.

Figure 7:
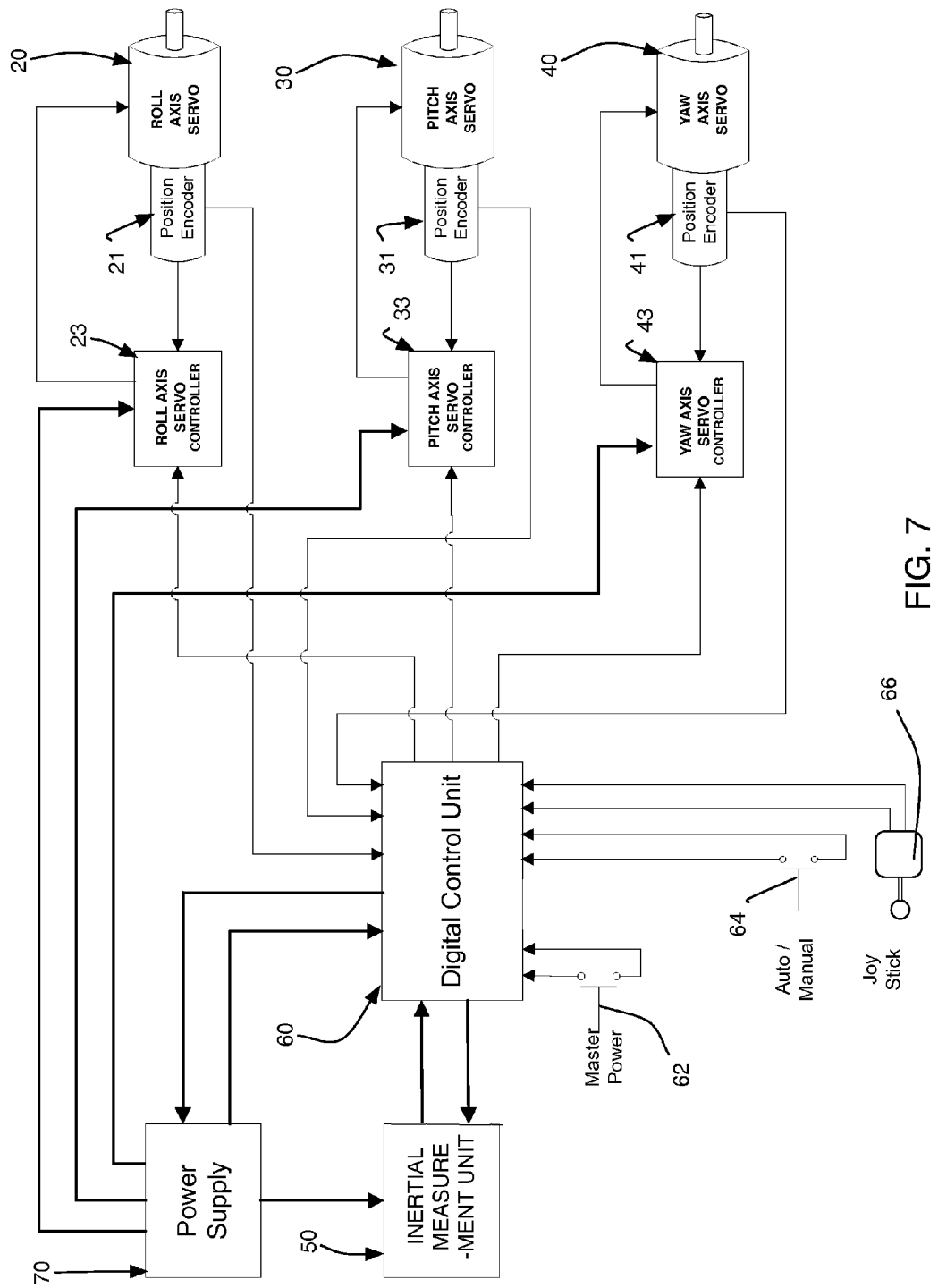

FIG. 7 is a schematic of the electrical connectivity of the components of an electronic control system for the gimbaled platform assembly in accordance with an embodiment of the invention.

Figure 8:
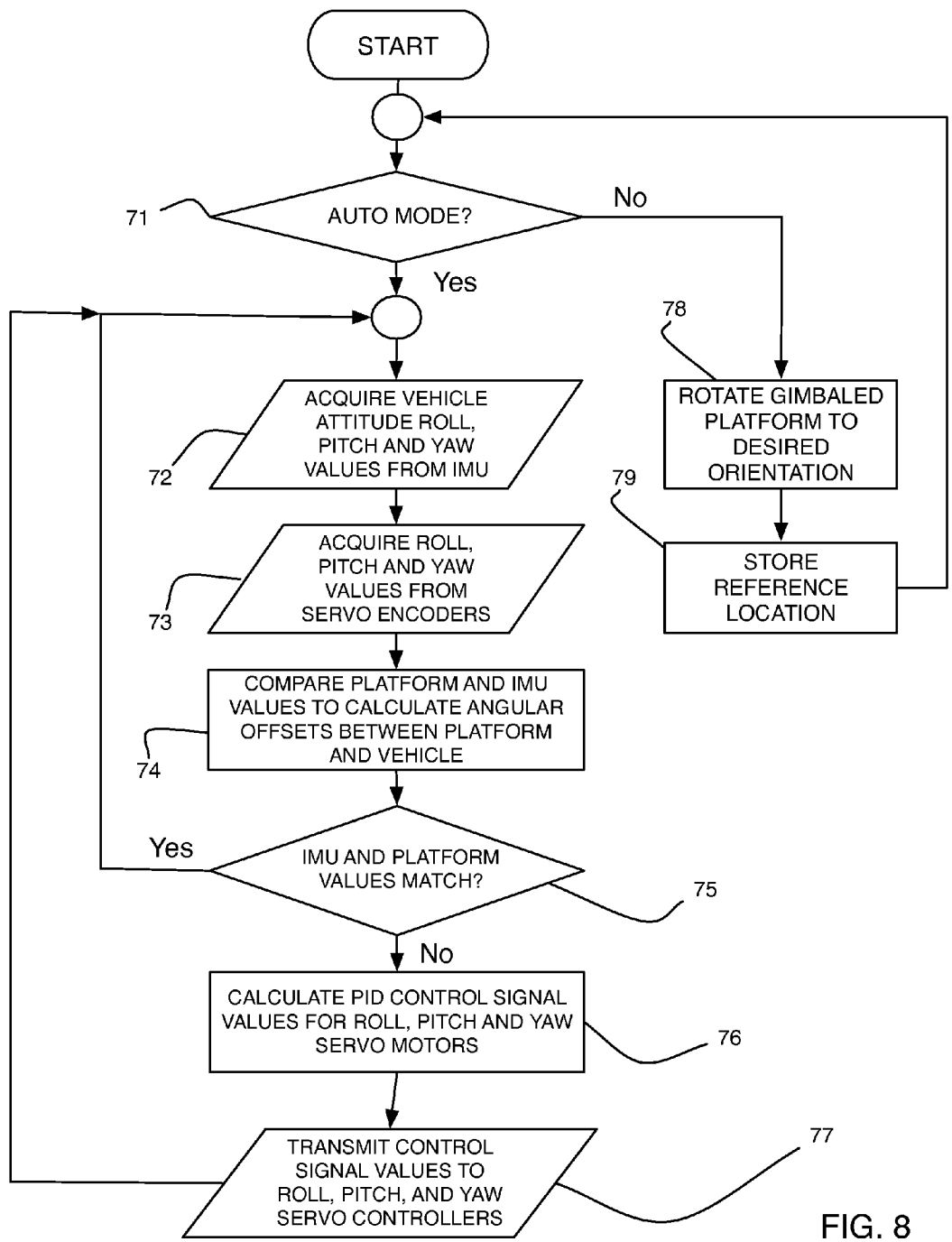

FIG. 8 is the flowchart illustrating the method implemented by the digital control unit for (i) calibrating, and (ii) controlling the gimbaled platform in accordance with an embodiment of the invention.

Figure 9:
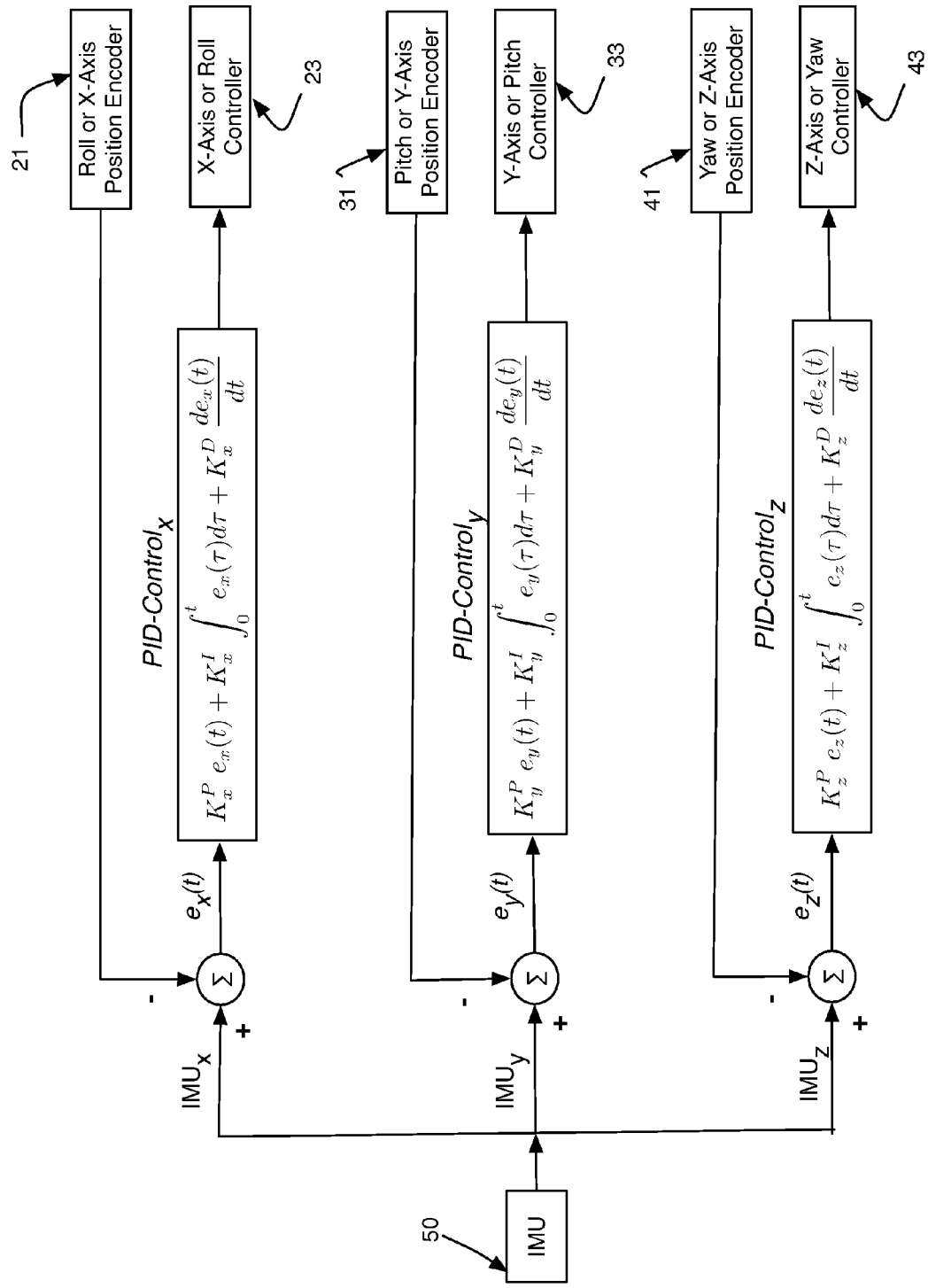

FIG. 9 is a detailed flowchart of the Proportional Integral Differential, or PID controller utilized in the method for controlling the gimbaled platform in accordance with an embodiment of the invention.

DRAWINGS

Reference Numerals

| | |
|---|---|
| Roll-Axis | 11 |
| Pitch-Axis | 12 |

-continued

| | |
|---|---|
| Yaw-Axis | 13 |
| Gimbaled Platform | 14 |
| Gimbaled Platform Assembly | 15 |
| Illumination Source | 16 |
| Roll Servo Motor | 20 |
| Roll Servo Encoder | 21 |
| Roll Motor Spindle | 22 |
| Roll Servo Controller | 23 |
| Roll Spindle Pillar | 26 |
| Roll Assembly Bracket | 28 |
| Pitch Servo Motor | 30 |
| Pitch Servo Encoder | 31 |
| Pitch Motor Spindle | 32 |
| Pitch Servo Controller | 33 |
| Pitch Spindle Pillar | 36 |
| Pitch Assembly Bracket | 38 |
| Yaw Servo Motor | 40 |
| Yaw Servo Encoder | 41 |
| Yaw Motor Spindle | 42 |
| Yaw Servo Controller | 43 |
| Base Bracket | 44 |
| Mounting Bracket | 48 |
| Inertial Measurement Unit | 50 |
| Digital Control Unit | 60 |
| Master Power Switch | 62 |
| Auto/Manual Switch | 64 |
| Joy Stick | 66 |
| Power Supply | 70 |
| Blocks in Electronic Control Method | 71-80 |

DETAILED DESCRIPTION

The invention disclosed in this application is an electronically controlled gimbaled platform assembly that is attached to a vehicle and includes a gimbaled platform capable of rotating about three predetermined axes, and actuator means for rotating the gimbaled platform about three predetermined axes wherein the actuator means upon receiving control signals of predetermined values rotate the gimbaled platform by a predetermined amount about the three predetermined axes. The invention further includes calibration means for specifying a desired orientation of the gimbaled platform, vehicle rotation measurement means for measuring instantaneous rotations experienced by the vehicle, platform orientation measurement means for measuring instantaneous orientation of the gimbaled platform, stability determination means for determining control signal values whereby the gimbaled platform maintains the desired orientation, and communication means for sending the determined control signal values from the stability determination means to the actuator means.

As the vehicle moves about and experiences dynamic rotational movements, the attached inertial measurement unit measures the rotational movements about the three predetermined independent axes. The rotational measurement data are communicated to an electronic control unit which uses the measurement data to compute the values of compensatory signals that nullify the effect of the vehicle's dynamic movements and thereby keep the gimbaled platform oriented steady and illumination source pointed to illuminate along a predefined direction. The computed compensatory signals are transmitted to the actuators that control the orientation of the gimbaled platform. As the control of gimbaled platform orientation occurs in real time, the direction of the illumination source is maintained regardless of the rotational movements experienced by the vehicle. Thus for example, the electronically controlled gimbaled platform steadies an illumination source as an automobile travels over an undulating terrain, or as a boat rocks over the waves.

The electronically controlled gimbaled platform uses a vehicle rotation measurement means for measuring instantaneous rotations about a roll-axis 11, pitch-axis 12, and yaw-axis 13. Vehicle's rotational measurements captured by the inertial measurement unit are processed by a digital control system in real-time and the compensatory signals to the actuators controlling the orientation of the gimbaled platform are communicated in real time such that a steady illumination unaltered by the dynamic rocking of the vehicle is maintained.

The electronically controlled gimbaled platform assembly 15 includes actuators means that change the gimbaled platform orientation about the roll-axis 11, the pitch-axis 12, and the yaw-axis 13. In an embodiment of the invention the actuator means include a first actuator, a second actuator, a third actuator for controlling the platform orientation about the roll-axis 11, the pitch-axis 12, and the yaw-axis 13 respectively, where the first actuator is a servo or a stepper motor, the second actuator is a servo or a stepper motor, and the third actuator is a servo or a stepper motor.

The roll-axis 11, pitch-axis 12, and yaw-axis 13 form an orthonormal frame of reference. In an embodiment of the invention the roll-axis 11, pitch-axis 12, and yaw-axis 13 correspond respectively to the X-Axis, the Y-Axis and the Z-Axis of a right hand coordinate system. Correspondingly, the roll-axis 11 is oriented at right angles to each of the pitch-axis 12, and to the yaw-axis 13. The pitch-axis 12 is oriented at right angles to each of the roll-axis 11, and to the yaw-axis 13. And, the yaw-axis 13 is oriented at right angles to each of the pitch-axis 12, and to the roll-axis 11.

Figure 1:
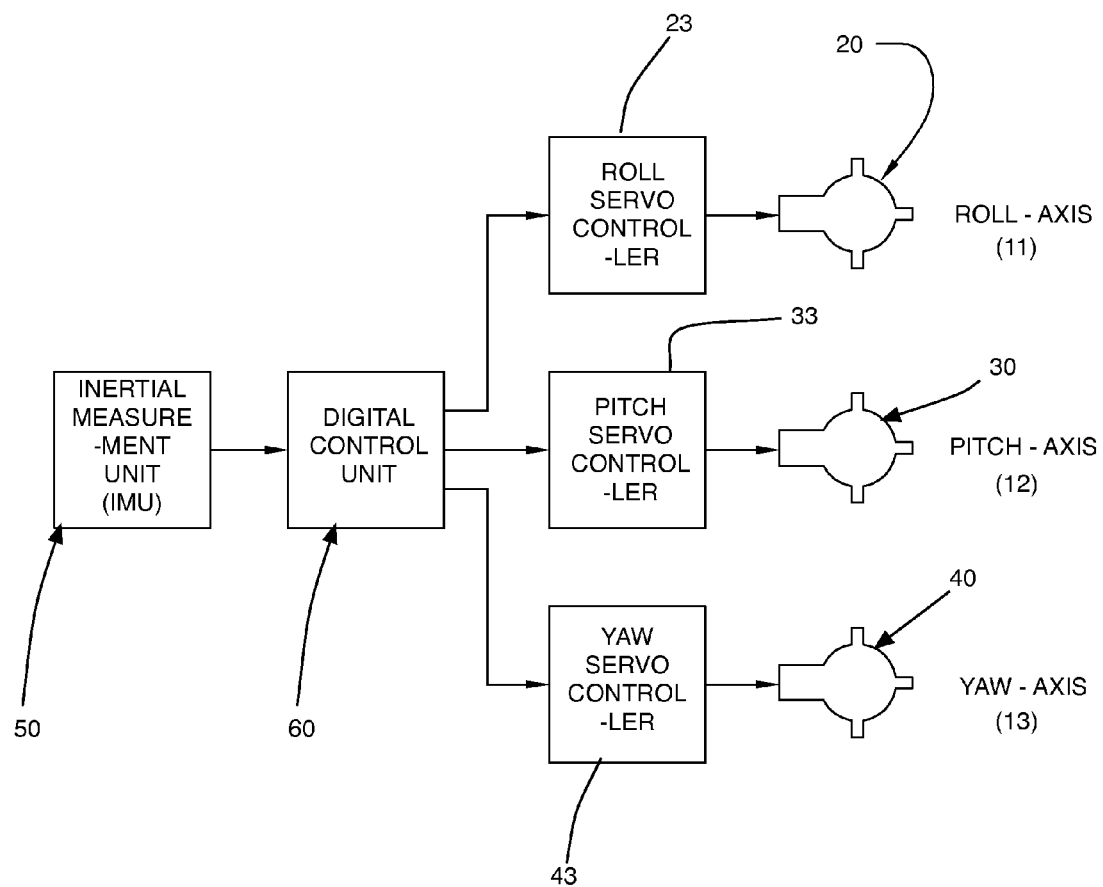

FIG. 1 illustrates a high level architecture of the electronically controlled gimbaled platform. As illustrated in FIG. 1, the electronically controlled gimbaled platform includes an inertial measurement unit 50, and a digital control unit 60, and a gimbaled platform assembly 15. The gimbaled platform assembly 15 includes a gimbaled platform 14 upon which an illumination source 16 is mounted. The inertial measurement unit 50 is fixedly attached to the vehicle body and measures the instantaneous rotations of the vehicle body about the roll-axis 11, the pitch-axis 12, and the yaw-axis 13.

In response to the instantaneous vehicle rotations measurements provided by the inertial measurement unit 50, the digital control unit 60 computes a plurality of compensatory signals that effectively nullify the affect of vehicle's instantaneous rotations. The plurality of compensatory signals are communicated to the roll servo controller 23, the pitch servo controller 33, and the yaw servo controller 43. Upon receiving the compensatory signals from the digital control unit 60, the servo controllers alter the orientation of the gimbaled platform 14 by communicating a predetermined set of control signals to a plurality of actuators which thereby maintain the illumination source 16 mounted on the gimbaled platform 14 in a steady direction. The embodiment of the invention shown in FIG. 1 illustrates the use of three actuators including the roll servo motor 20, pitch servo motor 30, and yaw servo motor 40 that operate to control the orientation of gimbaled platform 14 in the roll-axis 11, the pitch-axis 12, and the yaw-axis 13 respectively.

As shown in FIG. 1, the vehicle rotational measurement means for measuring dynamic rotations of the vehicle is implemented using an inertial measurement unit 50 fixedly attached to the vehicle. The inertial measurement unit 50 measures the instantaneous rotational movements of the vehicle in roll-axis 11, pitch-axis 12 and yaw-axis 13 and communicates these values to the digital control unit 60. Similarly, the instantaneous orientation of the gimbaled platform 14 is measured by platform orientation measurement means which includes a plurality of position encoders integrated within the actuators on the gimbaled platform assembly 15. In the embodiments of the invention shown in FIGS. 1-9, platform orientation measurement means are implemented using the roll servo encoder 21, pitch servo encoder 31, and a yaw servo encoder 41, which measure the instantaneous orientation of the gimbaled platform 14 with respect to the roll-axis 11, the pitch-axis 12 and the yaw-axis 13.

The electronically controlled gimbaled platform includes a calibration means for specifying a desired reference orientation of the gimbaled platform. In a "calibration" mode, the digital control unit 60 stores the desired reference orientation of the gimbaled platform 14 with respect to roll-axis 11, pitch-axis 12 and yaw-axis 13. In an embodiment of the invention, the calibration means is implemented using a joystick 66 wherein a predetermined movement of the joystick 66 in a predetermined direction results in a predetermined change of the desired reference orientation of the gimbaled platform 14.

After the calibration of digital control system is completed the system is typically put into an "auto" mode where it maintains the illumination source pointed steadily in the desired reference direction. In the auto mode, the digital control unit 60 compares the instantaneous orientation of the gimbaled platform 14 and the rotational measurements received from the inertial measurement unit 50 and computes a plurality of control signals that compensate for the transient rotational movements experienced by the vehicle. The compensation for transient rotational movements of the vehicle is performed by rotating the platform 14 in a sense that is opposite to the rotation of the vehicle in each of the roll-axis 11, pitch-axis 12, and yaw-axis 13. The compensatory signals thereby maintain the illumination source 16 attached to the gimbaled platform 14 along the desired reference direction steadily despite of the dynamic disturbances or movements of the vehicle upon which gimbaled platform assembly 15 is mounted.

In an embodiment of the invention, the inertial measurement unit 50 used for measuring instantaneous rotations experienced by the vehicle is fabricated as a high performance micro-electromechanical system and functions based on the properties of Coriolis effect using enhanced precision integrated accelerometers for each of the roll-axis 11, pitch-axis 12, and yaw-axis 13. Other embodiments of the invention may include a solid-state Laser Ring Gyroscope for measuring instantaneous rotations experienced by the vehicle about the roll-axis 11, pitch-axis 12, and yaw-axis 13.

Vehicle rotation measurement means, such as the inertial measurement unit 50, thereby provides real time rotation measurements to the digital control unit 60. Corresponding to these values, digital control unit 60 executes a program which results in computation of control signal that are sent through communication means to the actuators. In an embodiment of the invention, the communication means include the conductors that operate to electrically connect the digital control unit 60 to the roll servo controller 23, the pitch servo controller 33, and the yaw servo controller 43. The communication means further include the conductors that operate to electrically connect the respective servo controllers to the actuator means implemented by the roll servo motor 20, the pitch servo motor 30, and the yaw servo motor 40. In another embodiment of the invention, the communication means are implemented using fiber-optic cables that operate to optically connect the digital control unit 60 to roll servo controller 23, the pitch servo controller 33, and the yaw servo controller 43, and to further optically connect servo controllers to the respective actuators.

In an embodiment of the invention, means for stability determination include a program executed by the digital control unit 60. The digital control unit 60 is implemented using a micro-processor that performs the needed control calculations in real-time and sends appropriate control signal values to the roll servo controller 23, the pitch servo controller 33, and the yaw servo controller 43. The control signal values compensate for the rotations detected by the inertial measurement unit 50. Consequently, a clockwise rotation observed by inertial measurement unit 50 in a each of the roll-axis 11, pitch-axis 12, and yaw-axis 13 is compensated by a sending a plurality of control signals that produce a corresponding counter-clockwise rotation of the gimbaled platform 14 in the each of the roll-axis 11, pitch-axis 12, and yaw-axis 13.

The electronically controlled gimbaled platform assembly includes a roll assembly with a first roll spindle, a second roll spindle, a gimbaled platform of sufficient size to accommodate an illumination source wherein the gimbaled platform includes an edge, a roll bracket of sufficient size to accommodate the gimbaled platform having a predetermined roll axis, an upper roll surface, a lateral roll surface, a first roll pillar having a hole adapted to receive the first roll spindle, and a second roll pillar having a hole adapted to receive the second roll spindle wherein the first roll pillar and the second roll pillar are fixedly attached the upper roll surface, the first roll pillar and the second roll pillar are perpendicular to the upper roll surface, and the hole in the first roll pillar and the hole second roll pillar are disposed along the predetermined roll axis, wherein the first roll spindle is fixedly attached to a predetermined first point on the edge of the gimbaled platform and the second roll spindle fixedly attached to a predetermined second point on the edge of the gimbaled platform, and a roll actuator is attached to the first roll spindle whereby the first roll spindle is rotated about the predetermined roll axis.

The gimbaled platform assembly further includes a pitch assembly with a first pitch spindle, a second pitch spindle, a pitch bracket of sufficient size to accommodate the roll assembly having a predetermined pitch axis, an upper pitch surface, a lower pitch surface, a first pitch pillar having a hole adapted to receive the first pitch spindle, a second pitch pillar having a hole adapted to receive the second pitch spindle wherein the first pitch pillar and the second pitch pillar are fixedly attached the upper pitch surface and are perpendicular to the upper pitch surface, the hole in the first pitch pillar and the hole second pitch pillar are disposed along the predetermined pitch axis wherein the first pitch spindle is fixedly attached to a predetermined first point on the lateral roll surface of the roll bracket and the second pitch spindle fixedly attached to a predetermined second point on the lateral roll surface of the roll bracket, a pitch actuator attached to the first pitch spindle whereby the first pitch spindle is rotated about the predetermined pitch axis.

The gimbaled platform assembly further includes a yaw mounting bracket with a predetermined yaw axis, a yaw platform surface of sufficient size to accommodate the pitch assembly bracket, a base plate, a yaw actuator wherein the yaw actuator is fixedly attached to the base plate, a yaw spindle having a first and a second end wherein the yaw spindle is disposed along the predetermined yaw axis, and the first end of the yaw spindle is fixedly attached to a first predetermined point on the lower pitch surface, and the second end of the yaw spindle is fixedly attached to the yaw actuator whereby the yaw actuator operates to rotate the pitch bracket about the yaw axis.

Figure 2:
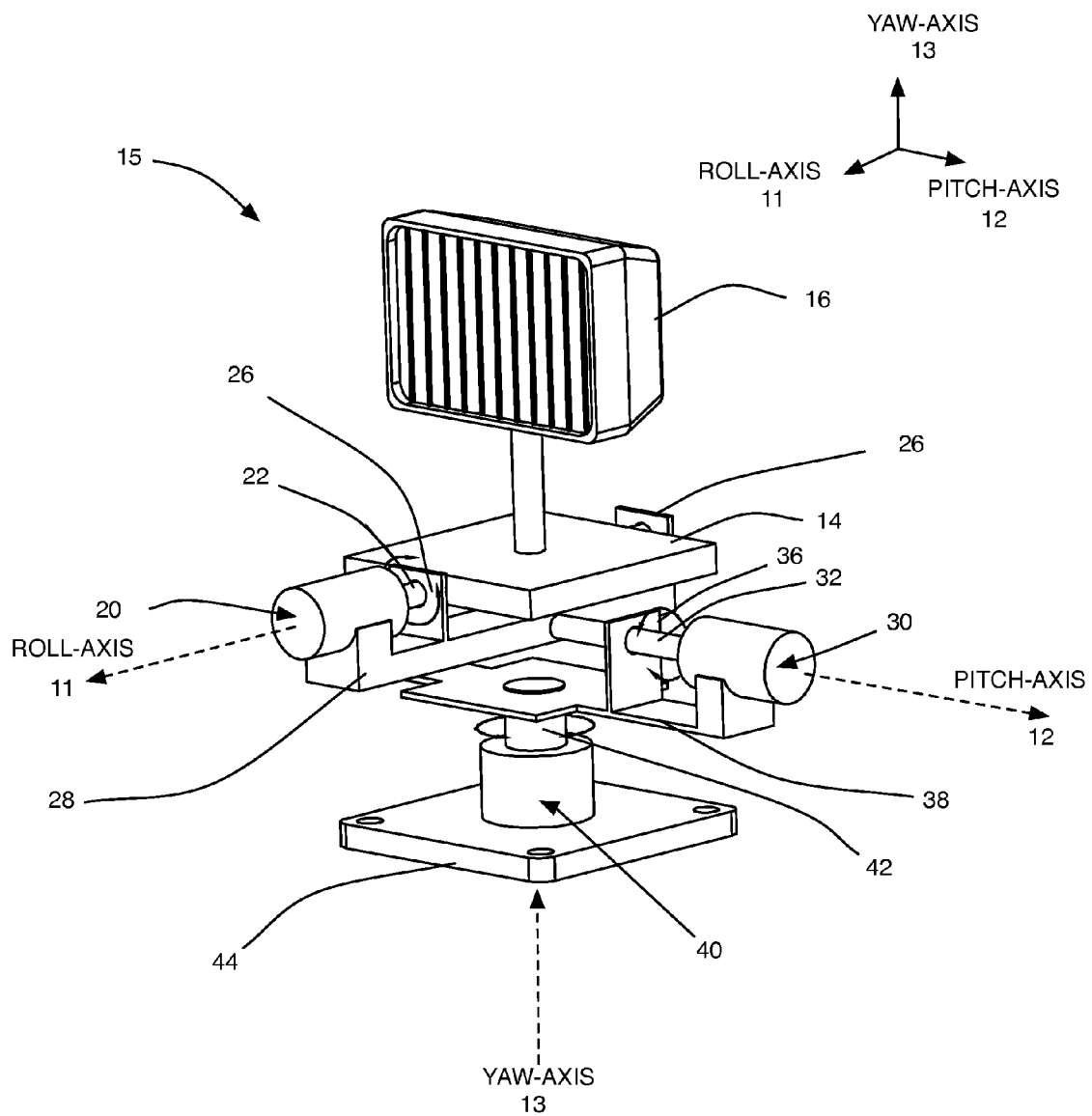

FIG. 2 provides an isometric view of an embodiment the electronically controlled gimbaled platform assembly 15 with a mounted illumination source. Also shown in this illustration are the actuators used in the embodiment comprising of the roll servo motor 20, the pitch servo motor 30, and the yaw servo motor 40 that respectively control the rotation of the gimbaled platform 14 about roll-axis 11, pitch-axis 12, and yaw-axis 13. A single illumination source 16 as shown in FIG. 2, or a plurality of illumination source(s) as shown in FIG. 6, are mounted on the gimbaled platform 14.

In an embodiment of the gimbaled platform assembly 15 shown in FIG. 2, platform 14 rolls about a roll motor spindle 22. The roll motor spindle 22 is fixedly attached to a roll servo motor 20 and to the gimbaled platform 14. A plurality of roll spindle pillars 26 guide the roll motor spindle. The roll spindle pillar 26 includes a hole defining an opening that allows the roll spindle 22 to freely rotate about the roll-axis 11. The roll spindle pillar 26 provides stability to the rotation of gimbaled platform 14. The gimbaled platform 14 is thereby rolled when the torque applied by the roll servo motor 20 is transferred to the gimbaled platform 14 through connected the roll motor spindle 22 thereby causing the gimbaled platform 14 to roll about the roll-axis 11. The roll assembly bracket 28 houses the roll servo motor 20, the roll motor spindle 22, the plurality of roll spindle pillars 26, and the gimbaled platform 14.

In an embodiment of the gimbaled platform assembly 15 shown in FIG. 2, a pitch motor spindle 32 operates to pitch the roll assembly bracket 28 about the pitch-axis 12. The pitch motor spindle 32 is fixedly attached to a pitch servo motor 30 and to the roll assembly bracket 28. A plurality of pitch spindle pillars 36 guide the pitch motor spindle. The pitch spindle pillar 36 includes a hole or an opening that allows the pitch motor spindle 32 to freely rotate about the pitch-axis 12. The pitch spindle pillar 36 provides stability to the rotation of the roll assembly bracket 28. The roll assembly bracket 28 is thereby pitched when the torque applied by the pitch servo motor 30 is transferred to the roll assembly bracket 28 through the connected pitch spindle 32 thereby causing the roll assembly bracket 28 to pitch about the pitch-axis 12. The pitch assembly bracket 38 houses the pitch servo motor 30, the pitch motor spindle 32, the plurality of pitch spindle pillars 26, and the roll assembly bracket 28.

In an embodiment of the gimbaled platform assembly 15 shown in FIG. 2, a yaw motor spindle 42 operates to yaw the pitch assembly bracket 38 about the yaw-axis 13. The yaw motor spindle 42 is fixedly attached to a yaw servo motor 40 and to the pitch assembly bracket 38. The pitch assembly bracket 38 is thereby yawed when the torque applied by the yaw servo motor 40 is transferred to the pitch assembly bracket 38 through the connected yaw spindle 42 thereby causing the pitch assembly bracket 36 to yaw about the yaw-axis 13. The yaw servo motor 40 is fixedly attached to a base bracket 44. The base bracket 44 enables the gimbaled platform assembly 15 to be installed wherever a steady illumination source is desired.

The electronically controlled gimbaled platform assembly 15 can have a single illumination source 16 mounted upon the gimbaled platform 14. Alternatively, the electronically controlled gimbaled platform assembly 15 can have plurality of illumination sources 16 mounted on the gimbaled platform 14.

Figures 3A, 3B, 3C:
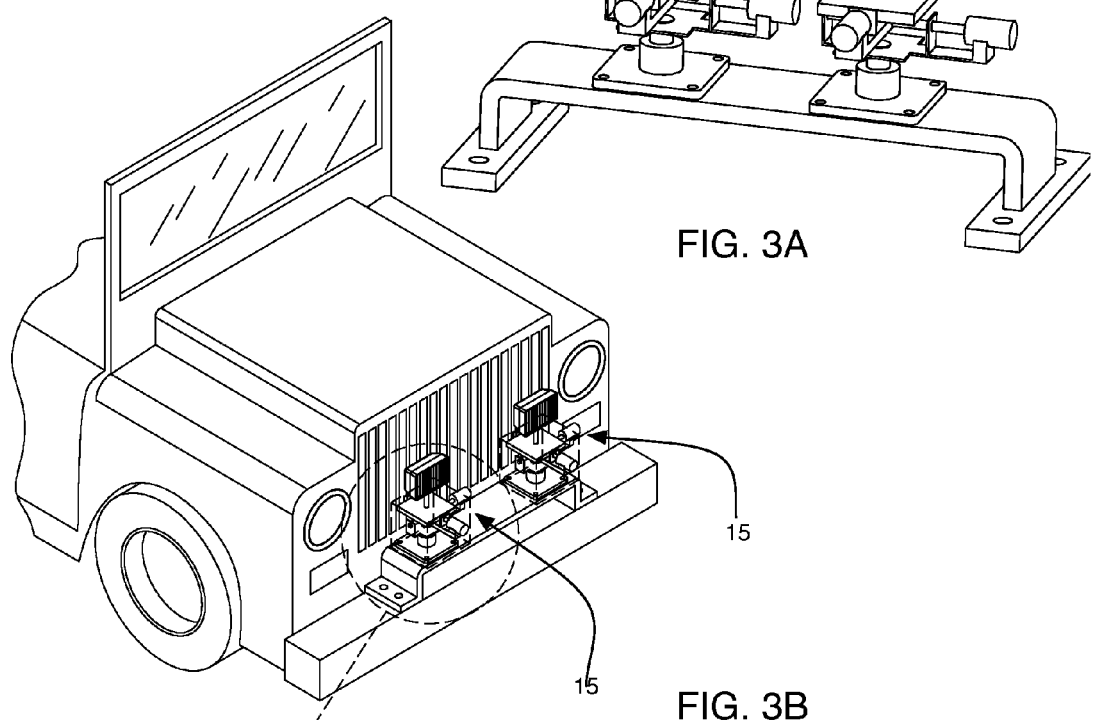
FIGS. 3A through 3E illustrate the use of a mounting bracket upon which the electronically controlled gimbaled platform is installed in accordance with an embodiment of the invention.
Figures 3D, 3E:
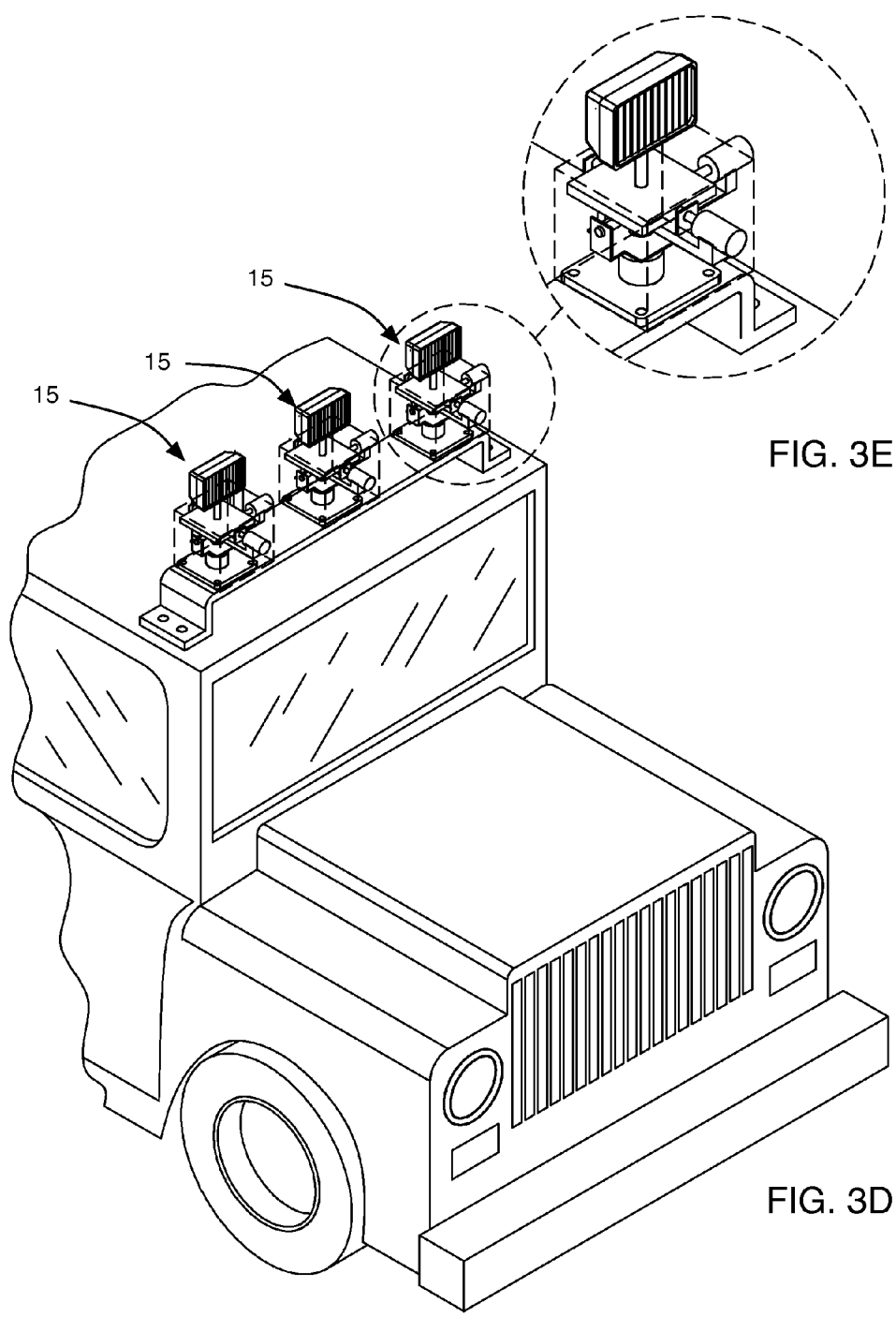

FIGS. 3A through 3E illustrate the use of mounting brackets for installing the electronically controlled gimbaled platform assembly 15. FIG. 3A illustrates a pair of electronically controlled gimbaled platform assemblies 15 each with a single illumination source 16 installed on a single mounting bracket. FIGS. 3B and 3C illustrate the mounting bracket installed on land vehicle wherein a pair of electronically controlled gimbaled platform assemblies 15 each has a single illumination source 16 installed on a single mounting bracket. FIGS. 3D and 3E illustrate a plurality of electronically controlled gimbaled illumination assemblies 15 installed on the roof of a land vehicle where each gimbaled platform assembly 15 is equipped with a single illumination source 16. Also, illustrated in FIGS. 3A through 3E is the outer boundary of a case for protecting the gimbaled platform assembly against weather or related elements.

Whenever a plurality of gimbaled platform assemblies 15 are used in an embodiment of the invention, the plurality of gimbaled platforms included therein may be controlled by a single digital control unit 60 that relies on a single inertial measurement unit 50 to coordinate orientation of a plurality of the gimbaled platform assemblies 15. Therefore, the plurality of gimbaled platform assemblies 15 operate in a synchronous manner under the control of a single digital control unit 60.

Figures 4A, 4B:
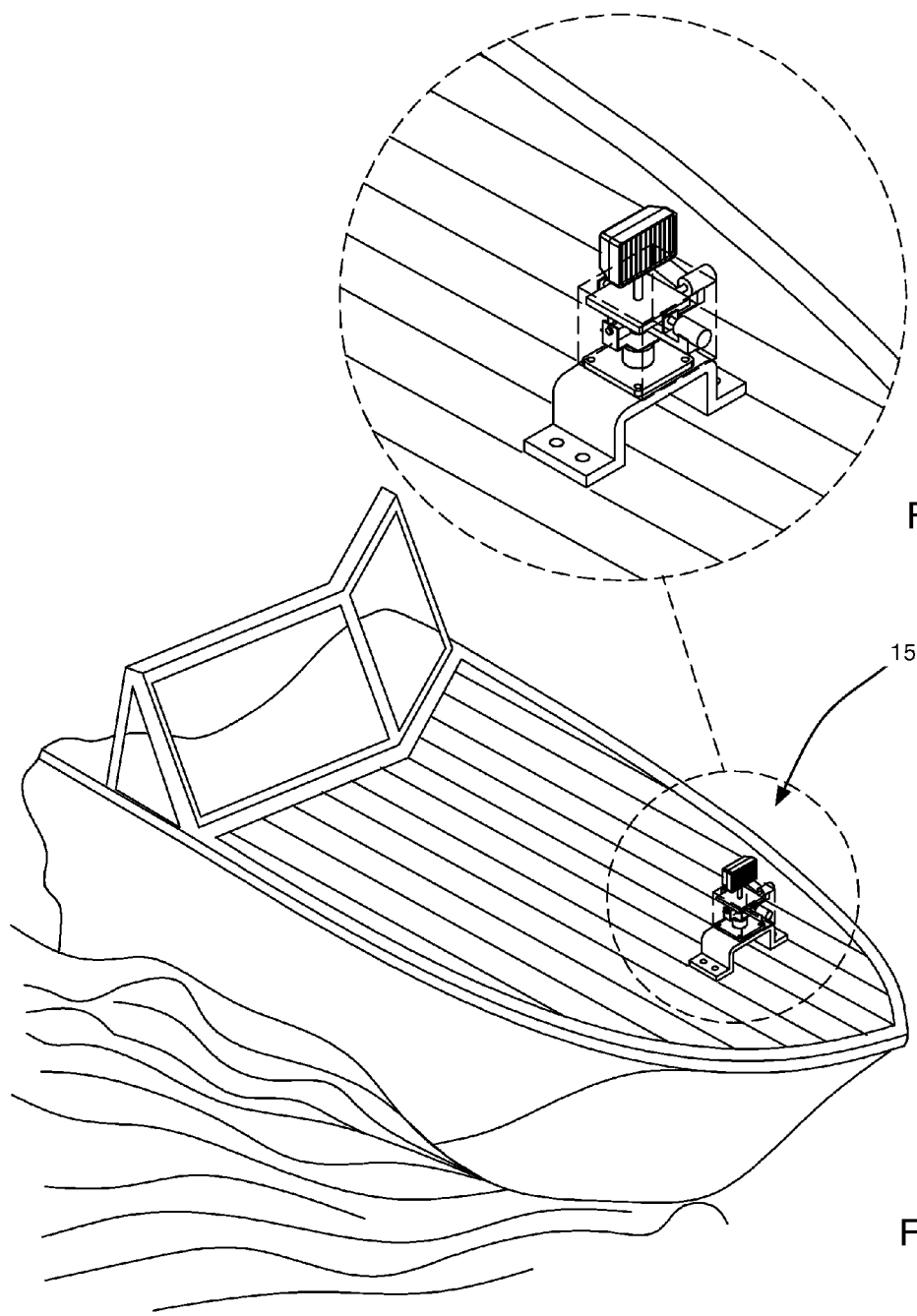
FIGS. 4A through 4B illustrates an electronically controlled gimbaled illumination source on a boat for providing a steady illumination along a path on the waterway in accordance with an embodiment of the invention.

FIGS. 4A and 4B illustrate the use of the electronically controlled gimbaled platform assembly 15 on a boat for providing a steady pathway illumination for a boat that rocks as it travels over the waves. In this application again, like the embodiments shown in FIG. 3, the gimbaled platform compensates for the dynamic rocking movements of a boat and steadies the direction in which the illumination beam is pointed. Such a steady beam of illumination is generated even when a water vehicle, such as a boat in this case, rocks as it repeatedly goes over the crests and troughs of the waves while moving. The illumination source 16 mounted upon gimbaled 14, operates to provide a constant and steady illumination and thereby enhances safety.

FIGS. 5A, 5B and 5C respectively illustrate the front, rear and side views of electronically controlled gimbaled platform assembly 15 with a mounted illumination source 16. The illustration shows the platform rotated about the roll-axis 11. Rotations about the pitch-axis 12, and the yaw-axis 13, similarly rotate the gimbaled platform to achieve a generalized rotation in all three independent directions. For the embodiment of the invention shown in FIG. 5A-C, a rotation about the pitch-axis 12 is achieved by pitch actuators such as the pitch servo motor 30, and a rotation about the yaw axis 13 is achieved by yaw actuators such as the yaw servo motor 40.

FIG. 6 illustrates a single electronically controlled gimbaled platform assembly 15 where a pair of illumination sources 16 are mounted on the gimbaled platform 14. The number and size of illumination sources 16 is limited by the maximum torque generating capability of the actuators incorporated in the gimbaled platform assembly 15. In the embodiment shown number and size of the illumination sources 16 will be constrained by the torque that the roll servo motor 20, the pitch servo motor 30, and the yaw servo motor 40, can generate. Lightweight materials, such as an alloy of aluminum or tin, help in reducing total inertial load on the gimbaled platform and thereby reduce the torque requirements of the actuators.

FIG. 7 is a block diagram schematic of the detailed connectivity of the components of the electronic system that controls the gimbaled platform assembly 15. The main components of electronic control system operate to control and alter the orientation of the gimbaled platform 14 about the roll-axis 11, pitch-axis 12, and yaw-axis 13. The components of the electronic control system include the inertial measurement unit 50; digital control unit 60; actuator circuitry comprising of roll servo motor 20 and roll servo encoder 21, pitch servo motor 30 and pitch servo encoder 31, yaw servo motor 40 and yaw servo encoder 41; the row servo controller 23, the pitch servo controller 33, and the yaw servo controller 43, that engage the respective servo motors based on the compensatory control signal values received from the digital control unit 50.

The power supply 70 is the source of electrical power to the entire system including the electronic control system and the actuators on the gimbaled platform assembly. In an embodiment of the system, a multi-level power supply is used to transform and deliver the appropriate voltage and current levels necessary for the proper operation of all the sub-system components. The master power switch 62 is used to turn on the digital control unit 60 and power up or power down the entire system. The inertial measurement unit 50, a solid state device, is supplied power from the master supply 70. The inertial measurement unit 50 is fixedly attached to the vehicle body and thus subjected to the same accelerations in the roll-axis 11, the pitch-axis 12, and the yaw-axis 13, as are experienced by the vehicle itself. The digital control unit 60 is connected to and is capable of communicating with the inertial measurement unit 50. The digital control unit 60 and the inertial measurement unit 50 coordinate in capturing attitude and dynamic changes experienced by the vehicle. A single pair of inertial measurement unit 50 and digital control unit 60 are capable of controlling and steadying the orientation of a plurality of predetermined number of gimbaled platforms based on the limitations on the supported connectivity and processing power of the digital control unit 60.

The process of defining the desired reference direction of the illumination source 16, or the homing orientation of the gimbaled platform 14, is referred to as calibration. In an embodiment of the system shown the auto/manual switch 64 and the joystick 66 are used to set the desired reference direction of the gimbaled platform assembly 15 and thereby the direction towards which the mounted illumination source 16 points.

Calibration means are used for defining the reference orientation direction for the gimbaled platform 14 and thereby the orientation of illumination source 16 mounted thereupon. Calibration means can set the desired reference direction of illumination source 16 in any general direction. While calibration means will generally orient the gimbaled platform 14 so that illumination source 16 points in the forward direction of vehicle movement, calibration means can orient the gimbaled platform 14 in any general direction wherever auxiliary illumination is desired. The desired reference direction of the illumination source 16, and the corresponding homing orientation of the gimbaled platform 14 established by the calibration means is saved by the digital control unit 60 and subsequently used in real-time control of the gimbaled platform 14.

In an embodiment of the invention, the calibration means for defining the desired reference direction of the illumination source 16, and correspondingly the homing orientation of the gimbaled platform 14, uses a joystick 66. An operator of the gimbaled platform assembly 15 can specify the desired reference direction by toggling the auto/manual switch 64 to the manual position and using the joystick 66 to manually orient the gimbaled platform 14 until the illumination source 16 points in the desired reference direction. Upon toggling the auto/manual switch 64 to the auto position the desired reference direction of the illumination source 16 is saved in the memory of the digital control unit 60.

The electronically controlled gimbaled platform assembly 15 includes a platform orientation measurement means for measuring instantaneous orientation of the gimbaled platform where the orientation measurement means includes a plurality of position encoders attached to the actuator means wherein the position encoders operate to capture changes in the orientation of the gimbaled platform about a roll, a pitch, and a yaw axis.

In the embodiment of the invention shown in FIG. 7, the actuator means is implemented by three servo motors for controlling the orientation of the gimbaled platform 14. The servo motors operate in real time to compensate for dynamic rotations of vehicle by steadying illumination source 16 through counter-sense rotations about the roll-axis 11, pitch-axis 12, and yaw-axis 13. The control system utilizes a distributed control paradigm wherein the coarse level control is performed by the digital control unit 50, and the servo controllers for each of the rotational axes perform a fine level control. The digital control unit communicates the control signal values that ought to be applied in each of the three axes to maintain the orientation of the gimbaled platform 14 in a steady configuration. Thereupon, the rotations of the roll servo motor 20 are controlled by roll-servo controller 23 using the roll position encoder 21 as a feedback mechanism for computing the error between the desired and the actual orientation of the roll servo motor 20. Concurrently, the rotations of the pitch servo motor 30 are controlled by pitch-servo controller 33 using the pitch position encoder 31 as a feedback mechanism for computing the error between the desired and the actual orientation of the pitch servo motor 30. Also concurrently, the rotations of the yaw servo motor 40 are controlled by yaw-servo controller 43 using the yaw position encoder 41 as a feedback mechanism for computing the error between the desired and the actual orientation of the yaw servo motor 40.

FIG. 8 is the flowchart illustrating the method implemented by the digital control unit 60. The flowchart provides the steps for implementing the calibration means as well as the stability determination and control means. Using the method illustrated in FIG. 8, the digital control unit 60 compensates for extraneous movements of the vehicle so that the gimbaled platform 14, and a plurality of mounted illumination source 16 steadily point towards the desired reference direction.

First in the method steps, the operating mode of the control system is determined wherein an "auto" operating mode is indicative that the digital control unit 60 is engaged. However, if the control system is not in an "auto" mode, calibration sequence is initiated (blocks 78-79).

If the digital control unit 60 is engaged, the values of rotations experienced by vehicle about the roll-axis 11, the pitch axis 12, and the yaw-axis 13, are acquired from the inertial measurement unit 50 (block 72). These values represent the instantaneous state of vehicle's attitude and are used to adjust the instantaneous value of the orientation of the gimbaled platform 14. The instantaneous value of the orientation of the gimbaled platform 14 with respect to the roll-axis 11, the pitch-axis 12, and the yaw-axis 13, are acquired respectively from the roll servo encoder 21, the pitch servo encoder 31, and the yaw servo encoder 41 (block 73). The two sets of instantaneous values are compared to determine if a correction is needed in the orientation of gimbaled platform 14 (blocks 74 and 75). If it is determined that the vehicle rotation data and the platform orientation matches and a correction is not required, as would be the case for example when a land vehicle is traveling over a smooth paved road, the control system reverts back to monitoring of the inertial measurement unit 50 (block 72) and the cycle (blocks 72 through 75) continues. However, if the comparison (block 75) does indicate significant jerking or bumping of the vehicle, the orientation of gimbaled platform is corrected by computing the requisite set of control signal values that would adequately compensate and cancel the effect of vehicle's dynamic bumping and jerking (block 76). The control signals are communicated to the roll servo controller 23, pitch servo controller 33, and the yaw servo controller 43 (block 77).

The electronically controlled gimbaled platform assembly 15 uses a stability determination means that evaluates control signal values as proportional to the difference between the actual and the desired orientation of the gimbaled platform 14. The stability determination means optionally further evaluates the control signal values as proportional to the integration of the difference between the actual and the desired orientation of the gimbaled platform 14. And, the stability determination means optionally further evaluates control signal values as proportional to the rate of change of the difference between the actual and the desired orientation of the gimbaled platform 14.

FIG. 9 is a detailed flowchart of the Proportional Integral Differential, or PID, controller used for controlling the orientation of the gimbaled platform 14. In an embodiment shown in FIG. 9, the PID control process is implemented as a method executed by a computer program in the digital control unit 60. Further, in an embodiment of the electronic control, the processing block 76 in FIG. 8 is implemented as a PID controller wherein the PID controller is the means utilized for controlling orientation of the gimbaled platform 14. FIG. 9 provides the steps utilized by the PID controller implemented by block 76 in FIG. 8.

The PID controller calculation involves three separate parameters based on the proportional or P, the integral or I, and the derivative or D values based on the 'error' defined as the difference between the desired and actual values of the orientation of the gimbaled platform 14. The proportional value is a reaction to the current error, the integral value is in response to the sum of recent errors, and the derivative value is a reaction to the rate at which the error is changing. These error terms are weighted using a set of system dependent constants and summed to produce a control signal for the actuators that operate to conform the gimbaled platform 14 along a steady orientation. Control signals produced by a PID controller are thus dependent on the present error or the P term, on an accumulation of past errors or the I term, and predicted future errors based on rate of change of error or the D term.

This application discloses a method for electronically controlling a gimbaled platform assembly including an illumination source mounted on a vehicle including the steps of: (i) presenting a gimbaled platform assembly including a gimbaled platform and a plurality of actuator means wherein the plurality of actuator means operate to change the orientation of the gimbaled platform, (ii) performing a calibration of the gimbaled platform whereby a desired orientation of the gimbaled platform is specified, (iii) measuring rotation experienced by the vehicle about a roll, a pitch, and a yaw axis, (iv) measuring an actual orientation of the gimbaled platform assembly, (v) determining a plurality of compensatory control signal values by comparing the actual orientation and the desired orientation of the gimbaled platform assembly, (vi) communicating the determined compensatory signal values to a plurality of actuators wherein the plurality of actuators control the actual orientation of the gimbaled platform, and (vii) having the plurality of actuators orient the gimbaled platform to conform with the communicated compensatory signal values. The steps (iii) through (vii) are performed, and the stability of the illumination source is achieved, to meet the real time requirement deadlines such that the illumination source is directed along the desired reference direction within the response time of a typical human eye. Therefore, a human observer sees no change in illumination as the direction of illumination source is compensated.

This application discloses a method for computing actuator control values for a gimbaled platform assembly mounted on a vehicle including the steps of: measuring the instantaneous rotations experienced by the vehicle, measuring instantaneous orientation of the gimbaled platform, and determining a plurality of control signal values wherein the control signals minimize the difference between the measured orientation and the desired orientation of the gimbaled platform whereby the desired orientation of gimbaled platform is maintained.

Control signals used to bring the platform to the desired orientation are applied to the actuators for altering the orientation of the gimbaled platform about the roll-axis 11, the pitch-axis 12, and the yaw-axis 13. There are three control signals denoted by $C_x$, $C_y$ and $C_z$ representing a summation of the proportional, integral, and differential control along the roll-axis 11, the pitch-axis 12, and the yaw-axis 13. Thus, a PID control is utilized in each of the three axes wherein the control signal is parameterized by three parameters $K^P$, $K^I$, and $K^D$ as the gain factors for proportional, integral and differential control for each of the three axes. Therefore, $K_x^P$, $K_x^I$, and $K_x^D$ represent respectively the proportional, the integral, and the differential gain factors along the roll axis 11; $K_y^P$, $K_y^I$, and $K_y^D$ represent respectively the proportional, the integral, and the differential gain factors along the pitch axis 12; and, $K_z^P$, $K_z^I$, and $K_z^D$ represent respectively the proportional, the integral, and the differential gain factors along the yaw axis 13. Equations (1) through (3) listed below depict the formulas for computing the values of the control signals that compensate for the movements of the vehicle and thereby steady the gimbaled platform and the illumination source mounted thereupon.

$$C_x = K_x^P e_x(t) + K_x^I \int_0^t e_x(\tau)d\tau + K_x^D \frac{de_x(t)}{dt} \quad (1)$$

$$C_y = K_y^P e_y(t) + K_y^I \int_0^t e_y(\tau)d\tau + K_y^D \frac{de_y(t)}{dt} \quad (2)$$

$$C_z = K_z^P e_z(t) + K_z^I \int_0^t e_z(\tau)d\tau + K_z^D \frac{de_z(t)}{dt} \quad (3)$$

Variables used in the Eq. (1) through (3) are as follows. The term $e_x(t)$, $e_y(t)$, and $e_z(t)$ denote the instantaneous errors defined as the difference between the orientation measured by the inertial measurement unit 50 and the values indicative of current platform orientation captured by the position encoders 21, 31, and 41. The instantaneous error value, accumulated or integrated error value, and the trend or derivative of the error value, are multiplied by gain values $K^P$, $K^I$, and $K^D$ respectively in each of the roll-axis 11, the pitch-axis 12, and the yaw-axis 13, to obtain value of the control signal sent to each of the respective servo controllers 23, 33, and 43.

The invention discloses a method for computing actuator control values resulting in a plurality of compensatory signals that are proportional to the difference between the actual and the desired orientation of the gimbaled platform in a roll, a pitch, and a yaw axis. The method for computing actuator control values further optionally includes the plurality of compensatory signals that are proportional to the integration of the difference between the actual and the desired orientation of the gimbaled platform in the roll, the pitch, and the yaw axis. The method for computing actuator control values further optionally includes the plurality of compensatory signals proportional to the rate of change of the difference between the actual and the desired orientation of the gimbaled platform in the roll, the pitch, and the yaw axis.

Some applications may require using only a subset of control values to provide the appropriate level of system control. This is achieved by setting the gain of undesired control value to zero. A PID controller is called a PI, PD, P, D or I controller in the absence of the respective control value, i.e. when the gain corresponding to the missing term(s) is set to zero. PI controllers are fairly common, since derivative action is sensitive to measurement noise. The determination of PID control parameters requires calibration that takes into account, but is not limited to, the following factors: power of the actuators, inertial loading of the gimbaled platform assembly components, number of illumination sources, size and weight of the gimbaled platform, etc.

While several aspects have been presented in the foregoing detailed description, it should be understood that a vast number of variations exist and these aspects are merely an example, and it is not intended to limit the scope, applicability or configuration of the invention in any way. Rather, the foregoing detailed description provides those of ordinary skill in the art with a convenient guide for implementing a desired aspect of the invention and various changes can be made in the function and arrangements of the embodiments of the invention without departing from the spirit and scope of the appended claims.

What is claimed is:

1. An electronically controlled gimbaled platform assembly comprising:
    gimbaled platform assembly attached to a vehicle and further comprises:
    a roll assembly including
        a first roll spindle,
        a second roll spindle,
        a gimbaled platform of sufficient size to accommodate an illumination source wherein the gimbaled platform includes an edge,
        a roll bracket of sufficient size to accommodate the gimbaled platform having
            a predetermined roll axis,
            an upper roll surface,
            a lateral roll surface,
            a first roll pillar having a hole adapted to receive the first roll spindle, and
            a second roll pillar having a hole adapted to receive the second roll spindle,
            wherein the first roll pillar and the second roll pillar are fixedly attached the upper roll surface, the first roll pillar and the second roll pillar are perpendicular to the upper roll surface, and the hole in the first roll pillar and the hole second roll pillar are disposed along the predetermined roll axis,
        wherein the first roll spindle is fixedly attached to a predetermined first point on the edge of the gimbaled platform and the second roll spindle fixedly attached to a predetermined second point on the edge of the gimbaled platform, and
        a roll actuator is attached to the first roll spindle, whereby the first roll spindle is rotated about the predetermined roll axis;
    a pitch assembly including
        a first pitch spindle,
        a second pitch spindle,
        a pitch bracket of sufficient size to accommodate the roll assembly having
            a predetermined pitch axis,
            an upper pitch surface,
            a lower pitch surface,
            a first pitch pillar having a hole adapted to receive the first pitch spindle,
            a second pitch pillar having a hole adapted to receive the second pitch spindle
            wherein the first pitch pillar and the second pitch pillar are fixedly attached to the upper pitch surface and are perpendicular to the upper pitch surface, the hole in the first pitch pillar and the hole in the second pitch pillar are disposed along the predetermined pitch axis,
        wherein the first pitch spindle is fixedly attached to a predetermined first point on the lateral roll surface of the roll bracket and the second pitch spindle fixedly attached to a predetermined second point on the lateral roll surface of the roll bracket,
        a pitch actuator attached to the first pitch spindle, whereby the first pitch spindle is rotated about the predetermined pitch axis;
    a yaw mounting bracket including
        a predetermined yaw axis,
        a yaw platform surface of sufficient size to accommodate the pitch assembly bracket,
        a base plate,
        a yaw actuator, wherein the yaw actuator is fixedly attached to the base plate,
        a yaw spindle having a first and a second end, wherein the yaw spindle is disposed along the predetermined yaw axis, and the first end of the yaw spindle is fixedly attached to a first predetermined point on the lower pitch surface, and the second end of the yaw spindle is fixedly attached to the yaw actuator, whereby the yaw actuator operates to rotate the pitch bracket about the yaw axis;
    a vehicle rotation measurement unit capable of acquiring a plurality of actual instantaneous vehicle rotation measurements about the predetermined roll, the predetermined pitch, and the predetermined yaw axis;
    a communication unit that communicates the plurality of instantaneous vehicle rotation measurements to an electronic controller wherein the electronic controller includes
        a calibration unit wherein a desired orientation of the gimbaled platform has been specified;
        a stability computation unit capable of determining a plurality of control signals needed by the roll actuator, the pitch actuator, and the yaw actuator for maintaining the gimbaled platform in the desired orientation;
        a output unit for communicating the plurality of control signals from the stability computation unit to the roll, the pitch, and the yaw actuator.

2. The electronically controlled gimbaled platform assembly of claim 1, wherein the roll actuator is a servo or a stepper motor.

3. The electronically controlled gimbaled platform assembly of claim 1, wherein the pitch actuator is a servo or a stepper motor.

4. The electronically controlled gimbaled platform assembly of claim 1, wherein the yaw actuator is a servo or a stepper motor.

5. The electronically controlled gimbaled platform assembly of claim 1 wherein the predetermined roll axis, the predetermined pitch axis, and the predetermined yaw axis form an orthonormal basis.

6. The electronically controlled gimbaled platform assembly of claim 1, wherein the plurality of actual instantaneous vehicle rotation measurements are obtained by attaching an inertial measurement unit to the vehicle.

7. The electronically controlled gimbaled platform assembly of claim 1, wherein a joystick supplies the desired orientation of the gimbaled platform to calibration unit.

8. The electronically controlled gimbaled platform assembly of claim 1, wherein the plurality of control signals produced by the stability computation unit are mathematically proportional to a difference between the actual instantaneous vehicle rotation measurements and the desired orientation of the gimbaled platform along the roll-axis, the pitch-axis, and the yaw-axis.

9. The electronically controlled gimbaled platform assembly of claim 1, wherein the plurality of control signals produced by the stability computation unit are proportional to an integral over a predetermined duration of a difference between the actual instantaneous vehicle rotation measurements and the desired orientation of the gimbaled platform along the roll-axis, the pitch-axis, and the yaw-axis.

10. The electronically controlled gimbaled platform assembly of claim 1, wherein the plurality of control signals produced by the stability computation unit are proportional to a rate of change of a difference between the actual instantaneous vehicle rotation measurements and the desired orientation of the gimbaled platform along the roll-axis, the pitch-axis, and the yaw-axis.

11. The electronically controlled gimbaled platform assembly of claim 1, wherein the plurality of control signals are labeled as $C_x$, $C_y$ and $C_z$ and represent a summation of a proportional, an integral, and a differential of errors $e_x$, $e_y$ and $e_z$ between the desired orientation of the gimbaled platform and the actual instantaneous vehicle rotation measurements along the roll-axis, the pitch-axis, and the yaw-axis respectively, where the control signals labeled $C_x$, $C_y$ and $C_z$ produced are computed using a plurality of following equations labeled (1), (2) and (3):

$$C_x = K_x^P e_x(t) + K_x^I \int_0^t e_x(\tau) d\tau + K_x^D \frac{de_x(t)}{dt} \quad (1)$$

$$C_y = K_y^P e_y(t) + K_y^I \int_0^t e_y(\tau) d\tau + K_y^D \frac{de_y(t)}{dt} \quad (2)$$

$$C_z = K_z^P e_z(t) + K_z^I \int_0^t e_z(\tau) d\tau + K_z^D \frac{de_z(t)}{dt} \quad (3)$$

with
$K_x^P$, $K_x^I$ and $K_x^D$ representing respectively a proportional gain factor, an integral factor, and a differential gain factor along the roll axis;
$K_y^P$, $K_y^I$ and $K_y^D$ representing respectively a proportional gain factor, an integral factor, and a differential gain factor along the pitch axis; and,
$K_x^P$, $K_x^I$ and $K_x^D$ representing respectively a proportional gain factor, an integral factor, and a differential gain factor along the yaw axis.

12. The electronically controlled gimbaled platform assembly of claim 1, wherein a plurality of actual instantaneous platform orientation measurements are made by a plurality of position encoders attached to the roll actuator, the pitch actuator, and the yaw actuator, and where the plurality of position encoders operate to capture the actual instantaneous vehicle rotation measurements about the predetermined roll axis, the predetermined pitch axis, and the predetermined yaw axis.

13. The electronically controlled gimbaled platform assembly of claim 1, wherein a single illumination source is mounted on the gimbaled platform.

14. The electronically controlled gimbaled platform assembly of claim 1, wherein a plurality of illumination sources are mounted on the gimbaled platform.

15. A method for electronically controlling a gimbaled platform assembly including a gimbaled assembly bracket and mounted on a vehicle by fixedly attaching the a gimbaled assembly bracket to the vehicle, wherein the gimbaled platform assembly comprises of a roll platform assembly including a gimbaled platform and adapted to rotate about a roll axis, and a plurality of actuators designed to rotate the platform about the roll axis, a pitch platform assembly adapted to rotate about a pitch axis, and a plurality of actuators designed to rotate the platform about the roll axis, a yaw platform assembly adapted to rotate about a yaw axis, and a plurality of actuators designed to rotate the platform about the yaw axis, where the yaw platform assembly is attached to the pitch platform and is rotatable about the yaw axis, the pitch platform assembly is attached to the roll platform and is rotatable about the pitch axis, and the roll platform is attached to the gimbaled assembly bracket and rotatable about the roll axis; rotational measurement unit attached to the vehicle having a capability to measure instantaneous rotation experienced by the vehicle about the roll, the pitch, and the yaw axis; and rotational measurement unit capable of measuring rotation of the gimbaled platform about the roll, the pitch, and the yaw axis; comprising the steps of:

providing a desired orientation of the gimbaled platform whereby the gimbaled platform maintains a steady orientation with respect to a horizontal plane;

measuring an actual instantaneous rotation experienced by the vehicle about the roll, the pitch, and the yaw axis;

measuring an actual instantaneous orientation of the gimbaled platform about the roll, the pitch, and the yaw axis;

determining a plurality of compensatory control signal values by comparing the actual instantaneous orientation of the vehicle, the actual instantaneous orientation of the gimbaled platform, and the desired orientation of the gimbaled platform;

supplying the determined compensatory signal values to a plurality of actuators, wherein the plurality of actuators control the actual orientation of the gimbaled platform; and having the plurality of actuators use the supplied compensatory signal values to orient the gimbaled platform to the desired orientation.

16. The method for electronically controlling a gimbaled platform assembly of claim 15, wherein the method for determining the plurality of compensatory control signal values comprises the steps of:

determining a plurality of errors $e_x$, $e_y$ and $e_z$ between the desired orientation of the gimbaled platform and the actual instantaneous orientation of the gimbaled platform along the roll-axis, the pitch-axis, and the yaw-axis respectively, determining a plurality of control signal values $C_x$, $C_y$ and $C_z$ along the roll-axis, the pitch-axis, and the yaw-axis respectively using a plurality of following equations labeled (1), (2) and (3) whereby the gimbaled platform is maintained in the desired orientation:

$$C_x = K_x^P e_x(t) + K_x^I \int_0^t e_x(\tau)d\tau + K_x^D \frac{de_x(t)}{dt} \quad (1)$$

$$C_y = K_y^P e_y(t) + K_y^I \int_0^t e_y(\tau)d\tau + K_y^D \frac{de_y(t)}{dt} \quad (2)$$

$$C_z = K_z^P e_z(t) + K_z^I \int_0^t e_z(\tau)d\tau + K_z^D \frac{de_z(t)}{dt} \quad (3)$$

with $K_x^P$, $K_x^I$ and $K_x^D$ representing respectively a proportional gain factor, an integral factor, and a differential gain factor along the roll axis;

$K_y^P$, $K_y^I$ and $K_y^D$ representing respectively a proportional gain factor, an integral factor, and a differential gain factor along the pitch axis; and, $K_z^P$, $K_z^I$ and $K_z^D$ representing respectively a proportional gain factor, an integral factor, and a differential gain factor along the yaw axis.

17. The method for determining the plurality of compensatory control signal values for a gimbaled platform assembly of claim 16, wherein the plurality of compensatory signals are proportional to the errors $e_x$, $e_y$ and $e_z$ between the actual instantaneous orientation of the gimbaled platform and the desired orientation of the gimbaled platform along the roll axis, the pitch axis, and the yaw-axis, wherein the roll gain factors $K_x^I$ and $K_x^D$, and the pitch gain factors $K_y^I$ and $K_y^D$, and the yaw gain factors $K_z^I$ and $K_z^D$ are set close to or equal to zero.

18. The method for determining the plurality of compensatory control signal values for a gimbaled platform assembly of claim 16, wherein the plurality of compensatory signals are proportional to the integration of errors $e_x$, $e_y$ and $e_z$ between the actual instantaneous orientation of the gimbaled platform and the desired orientation of the gimbaled platform along the roll axis, the pitch axis, and the yaw-axis, wherein the roll gain factors $K_x^P$ and $K_x^D$, and the pitch gain factors $K_y^P$ and $K_y^D$, and the yaw gain factors $K_z^P$ and $K_z^D$ are set close to or equal to zero.

19. The method for determining the plurality of compensatory control signal values for a gimbaled platform assembly of claim 16, wherein the plurality of compensatory signals are proportional to the rate of change of errors $e_x$, $e_y$ and $e_z$ between the actual instantaneous orientation of the gimbaled platform and the desired orientation of the gimbaled platform along the roll-axis, the pitch-axis, and the yaw-axis, wherein the roll gain factors $K_x^P$ and $K_x^I$, and the pitch gain factors $K_y^P$ and $K_y^I$, and the yaw gain factors $K_z^P$ and $K_z^I$ are set close to or equal to zero.

* * * * *